Oct. 4, 1932.  W. B. STOUT  1,880,520
AIRPLANE
Filed July 16, 1930  6 Sheets-Sheet 1

INVENTOR.
William B. Stout
BY
ATTORNEYS.

Oct. 4, 1932.  W. B. STOUT  1,880,520
AIRPLANE
Filed July 16, 1930  6 Sheets-Sheet 4

INVENTOR.
William B. Stout
BY
ATTORNEYS.

Oct. 4, 1932.   W. B. STOUT   1,880,520
AIRPLANE
Filed July 16, 1930   6 Sheets-Sheet 5

INVENTOR.
William B. Stout
BY
ATTORNEYS.

Oct. 4, 1932.  W. B. STOUT  1,880,520
AIRPLANE
Filed July 16, 1930  6 Sheets-Sheet 6

INVENTOR.
William B. Stout
BY
ATTORNEYS.

Patented Oct. 4, 1932

1,880,520

UNITED STATES PATENT OFFICE

WILLIAM B. STOUT, OF DETROIT, MICHIGAN

AIRPLANE

Application filed July 16, 1930. Serial No. 468,281.

This invention relates to airplanes, and relates more particularly to that type of airplane known as a flying wing.

An object of the invention is to produce an airplane having minimum non-lift area.

Another object of the invention is to provide an airplane that can fly at extremely low speeds without the addition of auxiliary devices.

Another object of the invention is to provide an airplane capable of high, forward speeds which at the same time can be landed in and flown out of very small spaces.

Another object of the invention is to provide an airplane capable of landing on and taking off from either land or water without necessity for cumbersome conversion gear.

Another object of the invention is to provide an airplane with a landing gear capable of adapting itself to ground having irregular contour.

Another object of the invention is to provide an airplane that can be easily and safely flown by pilots with minimum experience.

Another object of the invention is to provide an airplane with the power plant and propeller so placed with respect to the cabin that the airplane is extremely quiet in operation.

Another object of the invention is to provide an airplane with the cabin and wing structure so arranged that extreme visibility is obtained.

Another object of the invention is to provide an airplane with a self-contained catapult launching gear.

Still another object of the invention is to circulate the heat from the power plant through the wings to control the temperature thereof.

Another object of the invention is to fold the wings of an airplane so that the airplane may be stored within a very small space.

Another object of the invention is to provide a shipping container for the airplane which is a part of this invention, which may be used as the hangar for the airplane.

Other objects of the invention will be brought out in the following description:

The ordinary airplane is very inefficient in that there are too many surfaces necessary for stability and operation which do not contribute to the lift. In other words, there are too many surfaces offering resistance to the air passing an airplane which are not part of the wing. As a result, the ordinary airplane is from an aero-dynamic standpoint very inefficient. A small wing contributes all of the lift. The fuselage, the engine, the undercarriage, control surfaces, and a portion of the controls, all usually project into the air stream adding resistance to motion and requiring increased horse power for overcoming this resistance. With the present type airplane with all of the rigging, struts, wires, wheels, and engines, etc. exposed to the air stream, it requires a very great addition of horse power to add any considerable speed. Take, for example, an ordinary tri-motored commercial plane with 600 H. P., such a plane will cruise at about 95 miles per hour. By doubling the horse power on the same plane, the cruising speed is increased to 110 miles per hour—an additional 15 miles per hour only for an additional 600 H. P.

According to this invention, an airplane is constructed which may be termed a "flying wing". The motor and all bracing elements are enclosed within the wing contour and offer no resistance to the air stream.

In one embodiment of the invention a small cabin is placed before and in the leading edge of a large wing of low aspect ratio. In plan view, the airplane takes on the form resembling the old Eddy tail-less kite. The wing is thickest at the center and tapers to a thin section at the wing tip. The chord of the wing is greatest at its central point and decreases gradually from the central portion to the wing tip. With this arrangement, the central wing curve is in normally high speed section and the chord of the wing decreases as the thickness of the wing decreases. Measuring out from the center, the wing is seen to retain a high speed section throughout its entire span. The wing, as shown, has a comparatively low aspect ratio and has a maximum of surface for a minimum span. All contours of the airplane are long and thin so that high forward speeds can be obtained.

With the wing tapering in thickness and in chord, the wing surface decreases rapidly as the distance from its center increases. This results in the center of pressure being near to the center of the wing, so that bracing can be placed where the wing is thickest and best able to support the stresses. The stresses and the weight are concentrated near the center of the wing.

According to a feature of the invention, the fuselage, which by the way is not a fuselage as the term is ordinarily used, because it does not extend the length of the machine to the tail surfaces, it but a small body forward of and extending slightly into the leading edge of the large wing. The cabin portion of this body is forward of the leading edge of the wing so that passengers have free, unobstructed vision forward, above, and below.

According to another feature of the invention, the power plant is completely enclosed within the contour of the wing and the rear of the cabin. The propeller is placed above the elevator control surface at the rear of the plane and between two vertical rudders, and is at the end of a shaft supported above the surface of the wing. An advantage of this arrangement is that not only is the power plant removed from the air stream but the noise of the power plant and of the propeller is muffled enormously by their position to the rear of the cabin. The slip stream of the propeller is directly upon the rear control surfaces where it is most effective.

According to another feature of the invention, the large cumbersome undercarriage protruding into the air stream is done away with. I prefer to use a small wheel which may be retractible and steerable and so arranged that normally with the plane in flying position but a small portion protrudes below the body of the plane, so that but a small resistance is offered to the air stream.

According to another feature of the invention, it is proposed that an airplane be landed, not upon the ordinary wheeled undercarriage, but upon a central skid or upon a plurality of central skids. By using a skid or skids the airplane can be brought to rest more quickly due to the resistance offered by the skid or skids to the ground, and can also be landed on ground having irregular surface.

According to another feature of the invention, a self-contained catapult may be utilized to enable an airplane to arise from a very small space. The catapult is arranged to be operated by the pilot of the machine and is self-contained. The pilot arranges the catapult with a release trigger, tensions the catapult, climbs into his machine, starts his motor, releases the catapult, and rises at once without the necessity for a run. The catapult is drawn into the machine as the airplane moves forward. With this arrangement, a long take-off run is not necessary. The plane can rise in almost the same way as a bird so that very small spaces can be utilized for flying.

According to another feature of this invention, an airplane may be made an amphibian machine without requiring the addition of a large amount of mechanism either for adding a boat to a land machine, or adding a land gear to a flying boat as are the present practices. In all other designs the plane is either a good land plane and a poor boat, or a good boat and a poor land plane. The design of the airplane according to this invention is such that it may be used with equal facility for water or land manoeuvres without the necessity for cumbersome conversion gear.

According to another feature of this invention, heated air from the power plane may be circulated inside the wing and body as desired. Only sufficient outside air, as the temperature conditions and engine requirements may demand, is admitted. This has the double effect and advantage of controlling the temperature of the entire ship. As will be explained in more detail later on in this specification, by circulating the heat produced by the engine, the temperature of the entire plane is controlled, the hinges of all controls are heated, and the propeller is heated so that by merely closing the fresh air intake to the wing and running up the temperature a few degrees, ice formation is prevented.

An airplane according to this invention, as will be brought out in more detail later, is believed to be the first simple airplane capable of great speed range. Not only may the hight speeds be increased to the point of commercial requirements, but the landing speeds are decreased to a great extent. The application of the slots, flaps, etc. that are ordinarily used to decrease landing speeds, are merely devices to enable the wing to attack the air at steeper angles in landing without burbling and are not required according to this invention. Such mechanisms and gadgets add to the difficulty of flying and defeat the very object desired. The chief object in the development of airplanes for private owners is to make the planes easier to fly. The addition of attachments, adjustments, levers, etc., only adds to the number of things one might forget. Even though a plane came down to lower landing speed, this would involve the possibility of greater danger on account of the added elements, both human and mechanical.

With an airplane according to this invention, due to the aspect ratio, to the light wing loading, and to the absence of parasitic members, high flying speeds can be attained through the use of sufficient horse power and yet low landing speeds can be attained due to the ability of the wing to attack the air at angles of as high as 45 degrees without burbling.

According to another feature of this invention, the wing of the airplane may be adapted to be hinged in such manner that the wings can be folded over on top of each other. The airplanes, according to this invention, may be shipped within a container which can be utilized as a hangar at the flying field.

The invention will now be described with reference to the drawings, of which.

Figure 1:
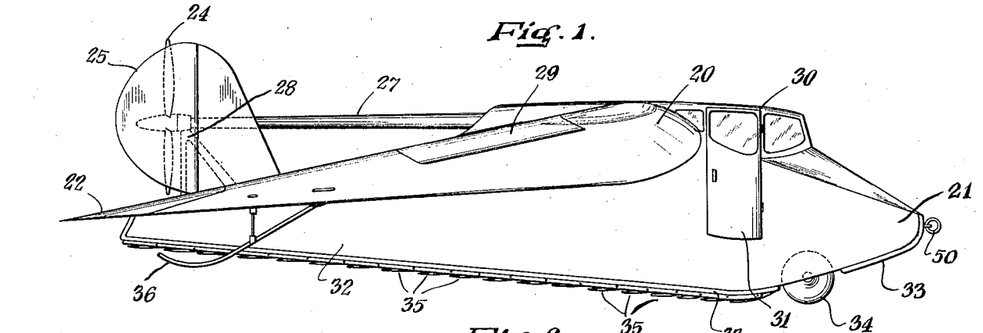
Fig. 1 is a side view of an assembled airplane according to this invention.
Figure 2:
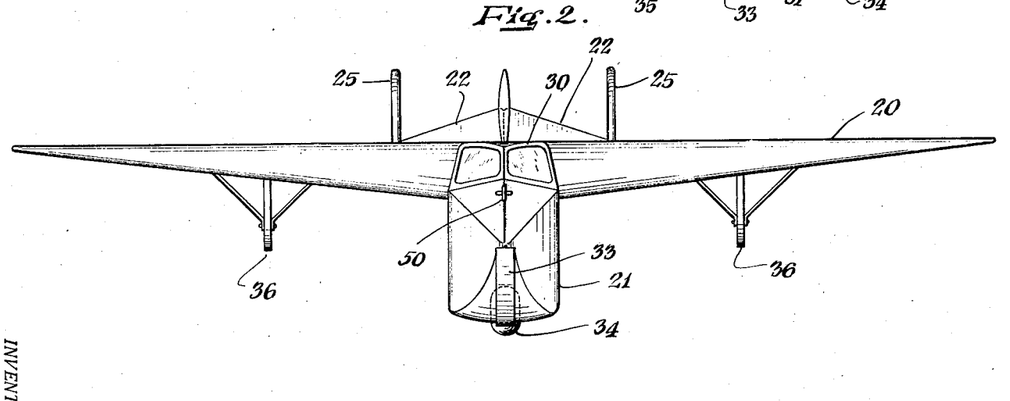
Fig. 2 is a front view of the airplane of Fig. 1 in flying position.
Figure 3:
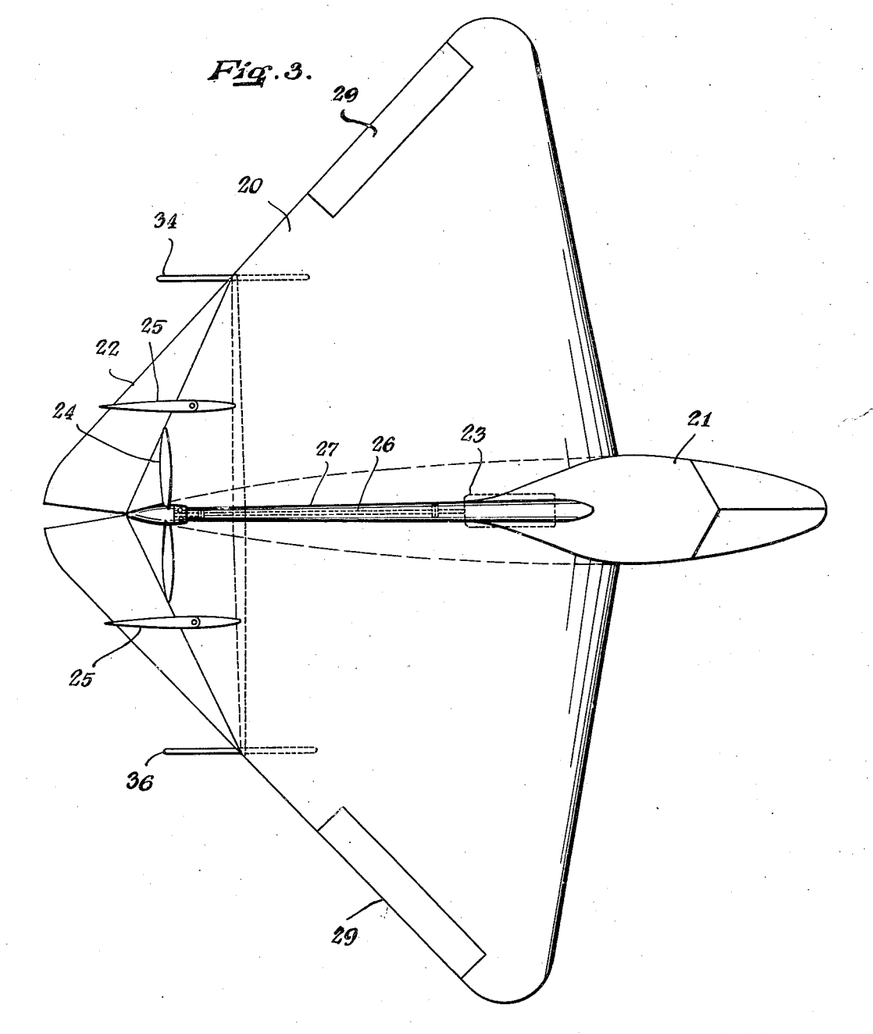
Fig. 3 is a plan view of the airplane as shown by Figs. 1 and 2.

Referring now to Figs. 1, 2, and 3 of the drawings, the general arrangement of an airplane according to this invention will be described.

Figure 11:
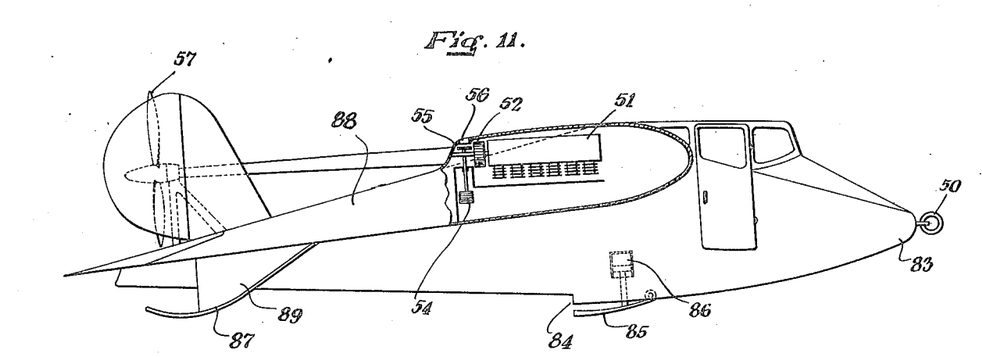
Fig. 11 is a side view with a portion of the body and wing in section of an amphibian type plane with an adjustable landing skid. This figure also shows how the heated air from an air-cooled airplane motor could be used to heat the wings and control surfaces of the airplane.

The large tapered wing 20 has supported in its leading edge the body portion 21. The elevator control surfaces 22 are a continuation of the wing 20. In the rear of the body portion 21 the power plant 23 is contained, no portion of this power plant extending into the air stream. The power plant is shown in dotted outline by Fig. 3 and more detail is shown by Fig. 11. The propeller 24 is placed at the rear of the wing 20 between the two rudder control surfaces 25. The propeller 24 is driven from the engine 23 by the long shaft 26 (Fig. 3) which passes through the tube 27. The shaft 26 is supported near the propeller 24 to the rear of the wing 20 by means of the journal. The aileron control surfaces 29 are placed back of the leading edge of the wing as shown by Fig. 3.

The front of the body portion 21 has a cabin 30 for two passengers with the seats arranged side by side. Entrance to the cabin is had by means of the door 31 which opens from the side. The body portion 21 does not extend to the rear of the wing but ends as shown by Fig. 3 just rear of the leading edge of the wing 20. The lower portion of the body portion 21 however as shown by Fig. 1 merges into the narrow keel 32 which extends as shown almost to the rear of the wing and which serves to support the landing skids.

Figure 4:
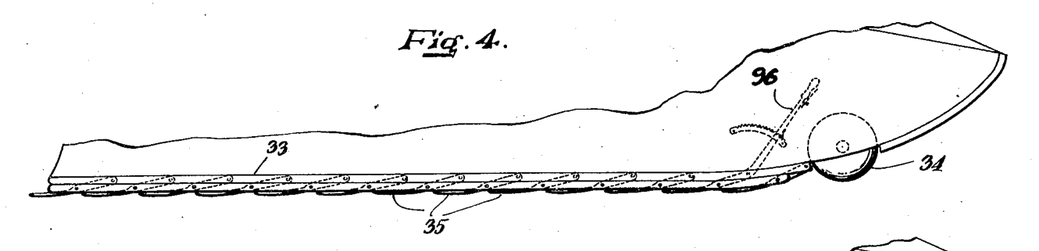
Fig. 4 is an enlarged view of the landing skid arrangement used in Fig. 1.
Figures 5, 6, 7, 8:
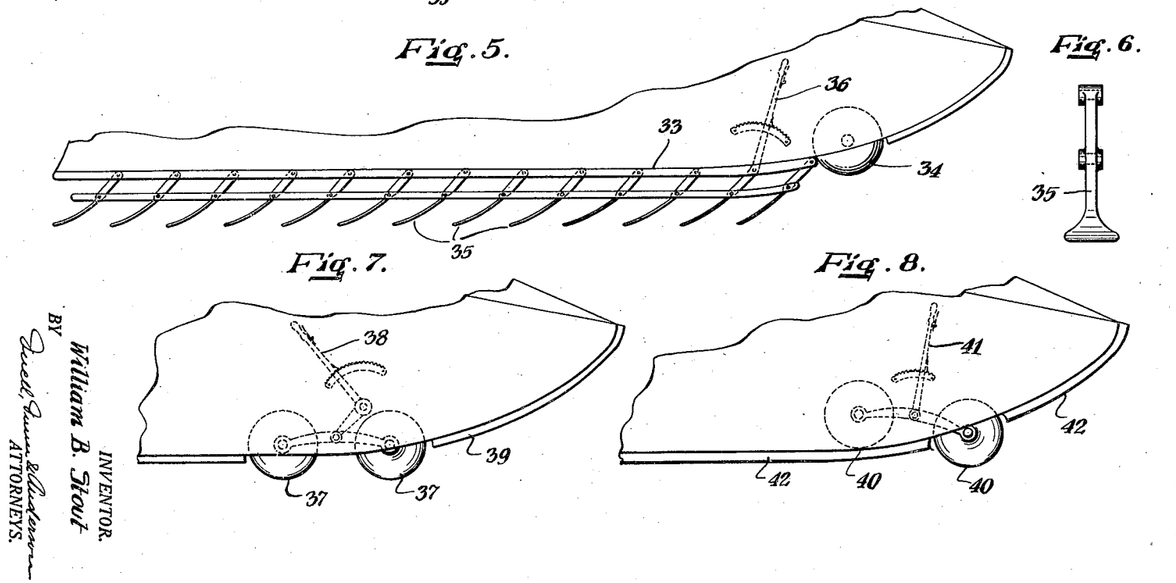
Fig. 5 is a view of the landing skid arrangement shown by Fig. 4, in extended position for landing.
Fig. 6 is a front view of one of the skids shown by Figs. 4 and 5.
Fig. 7 is a view of a two-wheel landing gear with a mechanism for lowering and raising one of the wheels.
Fig. 8 is a view of the arrangement shown by Fig. 7 with one of the wheels in raised position.

On the lower surfaces of the body portion 21 and the keel 32 the metal skid 33 is placed. Near the front of the body portion the skid 33 is cut away to accommodate the wheel 34 which may be used for taxiing or taking off the airplane illustrated in Figs. 1, 2, and 3. Back of the landing wheel 34 and attached below the keel skid 33 are the plurality of flexible skids 35. The arrangement of these skids is shown more clearly with reference to Figs. 4 and 5. Normally the skids 35 are in their retracted position as shown by Figs. 1 and 4. When it is desired to land the airplane, utilizing these skids by adjustment of the control lever 96, the skids are projected downward below the keel of the airplane as shown by Fig. 5. It is shown that the plurality of skids 35 project downwardly like the edges of feathers. This position of the skids 35 is that used for landing the airplane using this skid arrangement. Obviously as an airplane with the skids extended as shown by Fig. 5 strikes the ground, each one of the skids being flexible to forward motion thus preventing shock and at the same time offering resistance of forward motion thus slowing down speed of the plane on to the ground. It is also obvious that such a landing arrangement is ideal for landing on the ground having irregular contour. The skids 35 when landing on rough or irregular ground adjust themselves variably as the ground on which they rest varies in contour. With this landing arrangement, an airplane can be easily and quickly brought to rest on the roughest type of field, stones, undergrowth, small ditches and other irregularities being ineffective to disturb a landing. The airplane can be landed on the keel skid 33 with or without the flexible skids 35.

The two wing skids 36 are supported as shown by Figs. 1, 2 and 3 near the edge of the wing 20. These skids 36 serve to balance the plane when landing on the central skid 33 or the flexible skids 35. The airplane when landing thus contacts at three points. These skids 36 may be located as shown or further forward under the wing.

Fig. 3 shows the control surfaces 22 in the normal position they would assume when the airplane is in flight. Fig. 2 shows the control surfaces 22 in their extreme upper position—the position they would assume when the airplane was landing or climbing steeply. As shown by Fig. 2, the control surfaces join together to form, so to speak, a V-shaped scoop for offering the maximum elevator effect when in this position.

The rudder control surfaces 25 and the elevator control surfaces 22 are seen to be arranged in the slip stream of the propeller 24. With this arrangement, the maximum force of the propeller is exerted where it is needed most, that is, right at the control surfaces.

Fig. 6 shows a front view of one of the skids 35 of Figs. 1, 4, and 5, and shows how the skids are widened at their lower tips for contact with the ground and are narrowed elsewhere for flexibility.

Figs. 7, 8, 9, and 10 show other types of landing structures which may be used with the airplane of Figs. 1, 2, and 3.

Fig. 7 shows a landing gear comprising two wheels 37 in tandem, both wheels being retractible, their position being regulated by means of the lever 38. The wheels as shown by Fig. 7 for taking off and taxiing would be withdrawn in landing so that the airplane would land on the central keel skid 39.

Fig. 8 shows a landing gear arrangement comprising two wheels 40 in tandem, the rear wheel being retractible, its position being controlled by the lever 41. For landing and taxiing, the rear wheel 40 would be withdrawn from the body portion so that the airplane rests on both wheels. For landing, the rear wheel is drawn in to the body portion and the airplane is arranged to land on the keel skid 42 and the front wheel 40.

Figure 9:
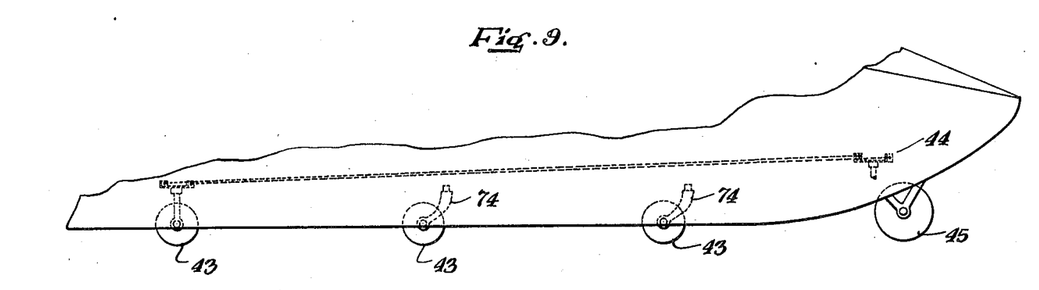
Fig. 9 is a view of a landing gear arrangement which may be used with the airplane of Fig. 1, but which is probably better adapted for larger type airplanes.

Fig. 9 shows a landing gear arrangement adapted for large heavy airplanes. The four wheels 43 are arranged in line down the center of the keel of the airplane. The front wheel may be fixed in position with the two central wheels mounted on pivots 74 and the rear wheel 43 being steerable from the rudder bar 44, as indicated, the wheels 43 being preferably of the Musselman type. With this arrangement, an airplane can be easily steered, although only a single set of wheels is arranged in tandem. The steering is controlled by means of the rear wheel 43, the two central wheels 43 adjusting themselves on the pivots 74 to permit turning of the airplane.

Figure 10:
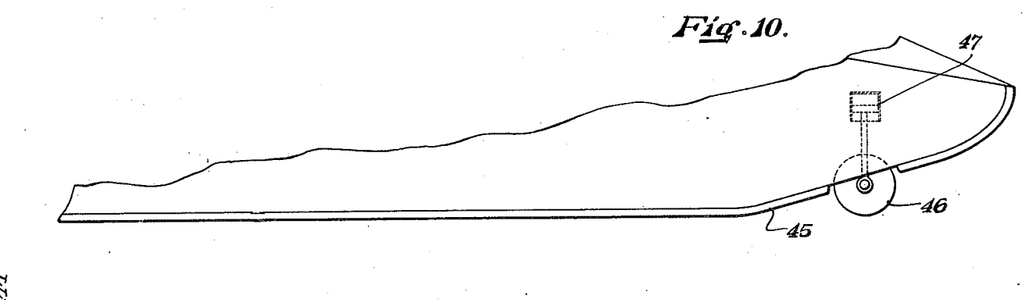
Fig. 10 is a view of an airplane with a central landing skid or keel, and a central retractible and steerable wheel which would be utilized for taking off.

Fig. 10 shows a portion of the body structure of an airplane adapted to be landed on central keel skid 45, the wheel 46 being retractible through the medium of a compressed air cylinder which may be controlled by the pilot of the airplane.

With the type of landing gear shown by Figs. 7, 8, 9, and 10, it is planned that wing skids such as those identified as 36 of Figs. 1, 2, and 3 will be utilized to balance the plane when on the ground. By using the centrally placed wheels here illustrated, it is obvious that a landing wheel arrangement offering the minimum of air resistance is utilized.

Figure 12:
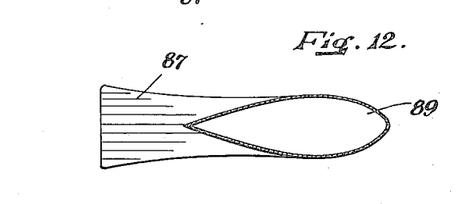
Fig. 12 is a top view in section of the rear skids of Fig. 11 and shows how the skids are arranged as pontoons for supporting the rear edge of the airplane of Fig. 11 when landing in water.

Referring now to Fig. 11, an airplane is shown of an amphibian type that is adapted to be landed either on land or water. The lower surfaces or the keel of the body portion 83 of the airplane has a step 84 for facilitating the rising of the plane from water. The skid 85 normally is folded up against the keel of the body portion 83 so that it offers no resistance to air or water. When it is desired to land the plane on the ground, the skid 85 is projected out from the keel of the airplane in the position shown by Fig. 11. A compressed air cylinder or any other suitable means controlled by the pilot serves to force out the skid 85. The wing skids 87 have formed between the upper surfaces and the lower portion of the wing 88 of the plane the air tight pontoon 89, a section of which is shown by Fig. 12. Fig. 12 also shows that the skid 87 is widened at its top to form a large contacting area when landing on the ground.

Figure 13:
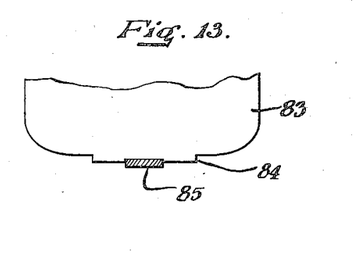
Fig. 13 is a partial front view of the airplane of Fig. 11 for the purpose of showing the contour of the hull or lower portion of an amphibian type plane.

Fig. 13 shows a section taken just in advance of the step 84 of Fig. 11 and shows the contour of the hull of the body 83. The airplane of Fig. 11 may be fitted with an internally arranged catapulting device which will be described in more detail later on. The catapult ring 50 is shown in its normal position in the nose of the body 83. The use of the catapult will be explained in the discussion of Fig. 15.

Figure 14:
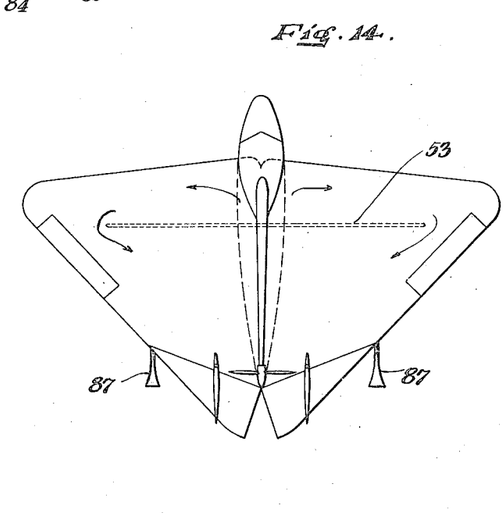
Fig. 14 is a plan view of the airplane of Fig. 11 and shows an arrangement for causing the air to circulate through the wing.

The airplane shown by Figs. 1, 2, and 3, 11 and 14 may be fitted with a heat circulating system shown by Figs. 11 and 14. The air cooled engine 51 has mounted at the rear end thereof the centrifugal blower 52 which serves to force air contained within the wing 88 past the cooling fins of the motor 51 around the baffle 52 in the direction indicated by the arrows of Fig. 14. The thermostat 54 is connected to the valve 55 and is adapted to close off fresh air intake 56 when the temperature of the air within the wing 88 has reached a predetermined desired level. Due to the peculiar arrangement of the control surfaces, the propeller and the wing of the airplane, according to this invention, air passing the wing is heated and heats in passing the propeller 57 and the hinges in the elevator rudder and aileron control surfaces, thus preventing the formation of ice on all of these members.

Figure 15:
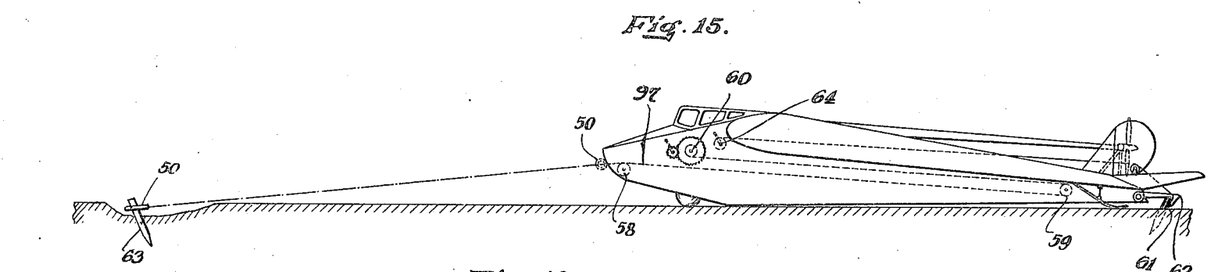
Fig. 15 is a side view of an airplane, according to this invention, equipped with the catapult arranged preparatory for taking the airplane off.

Referring now to Fig. 15 the catapult device adapted to be part of the airplane and its operation according to this invention will be described. Normally in the nose of the machine, as shown by Figs. 1, 2, and 11, the catapult ring 50 may be supported exterior to and against the nose of the airplane. Referring particularly to Fig. 15 the ring 50 is connected to one end of the elastic 97, the other end of the elastic passing over the pulleys 58 and 59, and being fixed within the nose of the machine or attached to a tensioning device 60. With the self-contained catapult device here disclosed, an airplane of efficient design such as that shown by Figs. 1, 2, and 3, for example, can take off from a very small space without the necessity for a run. The operation of the device for taking off will now be explained. The stake 61 is driven into the ground, preferably in a depression, and slanting rearwardly, as indicated. The notched lever 62 is in the tail of the machine and is slipped over the top of the stake 61. In advance of the nose of the machine, the stake 63 is driven into the ground so that it slants forward. The ring 50 with its attached elastic 57 is withdrawn from the nose of the machine and placed over the top of the stake 63. If the tensioning device 60 is not used, considerable energy will have to be expended in pulling the ring 50 over the stake 63. If the tensioning device 60 is utilized, the ring 50 may be placed over the stake 63 with less tension in the elastic 57, the tension being provided by manipulation of the tensioning device 60 by the operator of the machine. With the elastic at the desired tension, the pilot of the machine speeds up his motor to its maximum revolutions and then trips the notched lever 62 by means of the trigger 64. The airplane is then thrown into the air by the combined force of the propeller and the catapult. As the plane passes over the stake 63, the ring slips over the top of the stake, is drawn by the elastic 57, and is pulled back up against the nose of the machine to its normal position. With this arrangement, an airplane can take off from a very small space, little or no take-off run being required. The catapult is seen to be a part of the airplane. It occupies very little space and has very little weight, much less than that of an ordinary landing gear.

Figure 16:
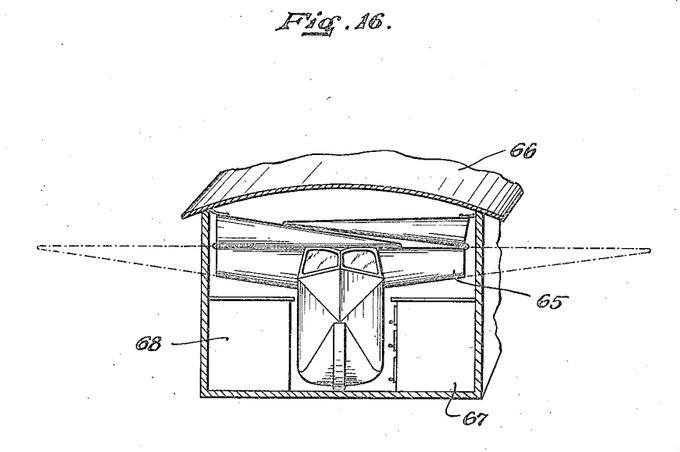
Fig. 16 is a partial view of the airplane, according to this invention, with its wings folded and within the shipping container according to this invention, (only a portion of the shipping container being shown).

According to a feature of this invention, the wings 65 of the airplane may be hinged and folded, as shown by Fig. 16, and the plane can be shipped and stored after shipment in the shipping container 66, a portion of which is there shown. The wings 65 are shown as having their ends folded over each other so as to occupy a very small space. Underneath the base portions of the wings may be arranged on one side the tool chest 67 and on the other side storage space 68 for gasoline, etc. The container 66 may be made of sheet cast iron or any other suitable material, the airplane being assembled with the wings folded. The owner or operator of the plane, after receiving it, may use the container 66 as a hangar for storage of the airplane when not in use. The wing of this type of plane has, as has been explained, very small aspect ratio and small span, and with the wings extended does not occupy much space; and so it can be appreciated that with the wings folded as in Fig. 16, the airplane and its container occupy but a very small space.

An airplane according to this invention has many desirable features. It is obvious that the design allows an extreme simplicity of power plant installation, tank location, control systems, and cabin location, etc., since there is available so much space within the wing. In the application of the power plant, the present design of airplanes may be used but at a disadvantage. It is preferred to have the airplane and motor back of the wing as shown since with my arrangement, the following advantages are obtained: extreme vision since the cabin portion is forward of the wing with no motor nor propeller in the way, silent operation since the noise is less due to the motor and propeller being in the rear, and safety since the engine may be located between the main wing spars on the center of pressure where there is plenty of structure available to suport the engine. The center of gravity is behind the nose so that there is no tendency for the plane to tip over on its nose, or roll over on its back. Due to the large wing spread, light wing loading and engine arranged near the center of pressure, there would be no tendency for the engine to be thrown forward onto the passengers.

The wing may be designed to have a normal high speed section tapering on a basis of 4 to 1 or better. The wing curve is preferred to be one having a minimum pressure shift. Also by having a wing of low aspect ratio, as shown, while this wing may have a relatively inefficient lift co-efficient, it can operate up to an attack angle fo 45° without burbling, thus permitting a very slow landing. With the wing structure according to this invention a very large area of light wing is obtained with a small span. Large aspect ratios, however, may be used if desired.

Another advantage of this type of wing design is that a thick wing structure is obtained of unusual strength, yet having a thin profile capable of being driven at high speeds. The spar depth of the wing at its central portion is seen to be fairly thick and to have a great chord. The wing tapers from its central portion to the tips and decreases in chord toward the tips. With such an arrangement the wing has its maximum surface and maximum pressure moments near the center. At most, the wing has a very small span and since the surface decreases towards the wing tips, there is but little pressure exerted on the thinner portion of the tapered wing. By tapering the wing, one is able not only to eliminate torsional stress but also to decrease weight as one measures out from the fuselage.

Another advantage of this tapered wing arrangement is that gusts of wind will not upset the plane's stability because of the decreasing wing area as one gets out from the fuselage. Shocks from gusts will be more up and down than disturbing to the lateral line of flight.

With the extreme visibility, the strength of the structure, the slow landing speeds, the quietness of operation, it is obvious that this type of plane is one that should appeal to the private owner. According to this design, high forward speeds can be obtained and at the same time landing speeds may be decreased without the addition of slots, flaps and other necessarily adjustable mechanically operated devices.

By having the engine and propeller to the rear, noise in flying is not only decreased but the propeller is so located with reference to the controls that the rudders and elevators in operation move up into the slip stream from the propeller so as to get quick and immediate action when the motor is running. The elevators at the rear are at such an angle that when they are in their top position they come together to form a solid V to scoop up the air in solid stream, thus giving much more definite control than the ordinary elevator would. By putting the elevators in the slip stream the pilot of the machine is able to pull out of any dive almost instantaneously. By having the rudders arranged on each side of the propeller regardless of which way the airplane is turned, one of the rudders moves into the slip stream from the propeller, giving instantaneous control.

By having an airplane adapted to be landed on a skid or on a plurality of skids, as has been described, it can land on a much smaller space and on the ground than is possible with all other types of airplanes. A plane can land in a field rougher and smaller than with any other type of plane. With the catapult feature utilized, it can take out of fields smaller than is possible in other types of planes. Most of the weight of the ordinary landing gear is saved and an increase of efficiency of operation is obtained due to the small air resistance of the present landing gear. Both weight and resistance are lessened. In taking off, the catapult feature may or may not be used. It will be noted that with reference to Figs. 1 and 2 of the drawings that the central wheel is mounted near the front of the machine so that with the plane in landing position, the wheel would not contact with the ground. The keel of the airplane rests on the ground. If it is desired to take off or to taxi, the tail of the machine is lifted according to the ordinary practice of directing the slip stream of the propeller on the elevators, whereupon the airplane will be supported upon the central wheel, the wing skids preventing the wing tips from contacting with the ground while the airplane is gaining speed enough for the ailerons to control the balance of the machine.

It is obvious that the airplane according to this invention adapts itself readily to operation on land or water. By merely waterproofing the body portion of the plane and arranging the skids to form small pontoons, an amphibian airplane without elaborate conversion gear is obtained. In landing on water the body takes the shock and forms the main hull. The wing skids arranged as pontoons prevent the machine from rolling over even on rough seas. In case of very rough seas the wing surface itself is so buoyant that one wing could not get under water. This is believed to be the first amphibian type of plane which does not require a large amount of mechanism for a conversion gear. The ordinary conversion gear adds considerable weight and resistance to an amphibian machine in addition to the complications of mechanical structure required.

Ice formation is one of the great problems of air traffic, particularly where schedules must be kept regardless of weather conditions. It has often been proposed that wings be heated to avoid ice formation. This, however, is not a solution, for a variation of one degree in temperature may determine whether or not ice will form. Moreover, ice formation on the wings is not the only problem encountered. Ice formation on the propeller and on the hinges of the control surfaces also offers problems. With the heating arrangement disclosed according to this invention with the propeller and control surfaces at the rear, the temperature of the air within the wing can be controlled so as to heat the hinges of all control surfaces, the propeller being heated by the heat from the wing. When ice starts to form, the fresh air intake from the wing may be closed so as to run up the temperature a few degrees above that essential to ice formation. In a hard snow storm where the snow melts and tends to stick to the wing because of the wing being too hot, the fresh air intake can be opened to cool off the wing so that the snow will not stick.

An airplane according to this invention is believed to be one that will greatly appeal to the private owner. Due to the arrangement of the engine and the propeller in the rear of the enclosed cabin, the airplane will be quiet in operation and as a result not only the enjoyment of flying will be greater, but the fear of flying will be less.

With the propeller in the extreme rear over the elevator control surfaces and between the rudder control surfaces, it is obvious that there is but little possibility of anyone stepping into the propeller. Thus, another element of danger and point of criticism of the ordinary airplane is eliminated.

With the cabin portion where the passengers are seated placed in front of the elevator edge of the wing, extreme visibility is had. This also adds to the enjoyment of and to the feeling of safety in flying. Also with this arrangement, it is believed that a person can be taught to fly in a much shorter time. The experience gained in instructing beginners in gliding shows that with the seat in front of the wing, the pupil learns much more quickly.

Due to the large lightly-loaded wing and to the absence of parasitic members in the air stream, the airplane will have a high forward speed yet a slow landing speed. With the peculiar type of skid landing gear, not only is much of the resistance of the ordinary type of under carriage done away with, but the airplane can land in a smaller space and on rougher ground.

Due to its low minimum speeds even in case of a crash the passengers would not suffer injury. Beginners can be taught to fly in a very short time. Due to the absence of noise, the extreme visibility and slow landing speed and the easy handling, it is believed that a beginner would require not more than two hours or so for soloing in this type of machine. Due to the wings' ability to attack the air at angles of up to 45° without burbling, the airplane would be very difficult to stall and impossible to spin in ordinary flying maneuvers.

Due to all these advantages, an airplane according to this invention is believed to be one that will appeal to the private owner. Not only is the airplane safe and easy to fly, but due to the simplicity of construction, it can be manufactured cheaply at prices approaching those of medium priced automobiles.

Several features of the invention have been described in one or more embodiments for the purpose of illustration, but it should be understood that the invention is not limited to any particular embodiment described but covers all embodiments in which the invention may be utilized. The invention is only to be limited by the annexed claims.

Having described my invention, what I claim as new and desire to secure by Letters Patent, is:

1. An airplane comprising a wing, a body portion in the front of said wing, elevator control surfaces forming a portion of the rear of said wing, a pair of rudder control surfaces supported above the rear of said wing, a power plant between said control surfaces and said body portion, and a propeller between said rudder control surfaces driven by said power plant.

2. An airplane comprising a wing, a body portion extending below and ending substantially at the end of the wing, the upper part of said body portion and the upper part of said wing being integral, a passenger carrying portion in said body portion and extending in front of said wing, a power plant mounted between the front and rear of said wing, and a propeller mounted above and at the rear of said wing and driven by said power plant.

3. An airplane comprising a wing, a fuselage having a portion extending substantially in advance of said wing, elevated control surfaces forming a portion of the rear of said wing, a pair of rudder control surfaces supported above the rear of said wing, a power plant and a propeller between said rudder control surfaces driven by said power plant.

In testimony whereof I affix my signature.
WILLIAM B. STOUT.